Nov. 30, 1926.
H. S. ASHENHURST
1,608,690
PROCESS OF AND APPARATUS FOR FORMING CELLULAR BUILDING BLOCKS
Original Filed August 7, 1924
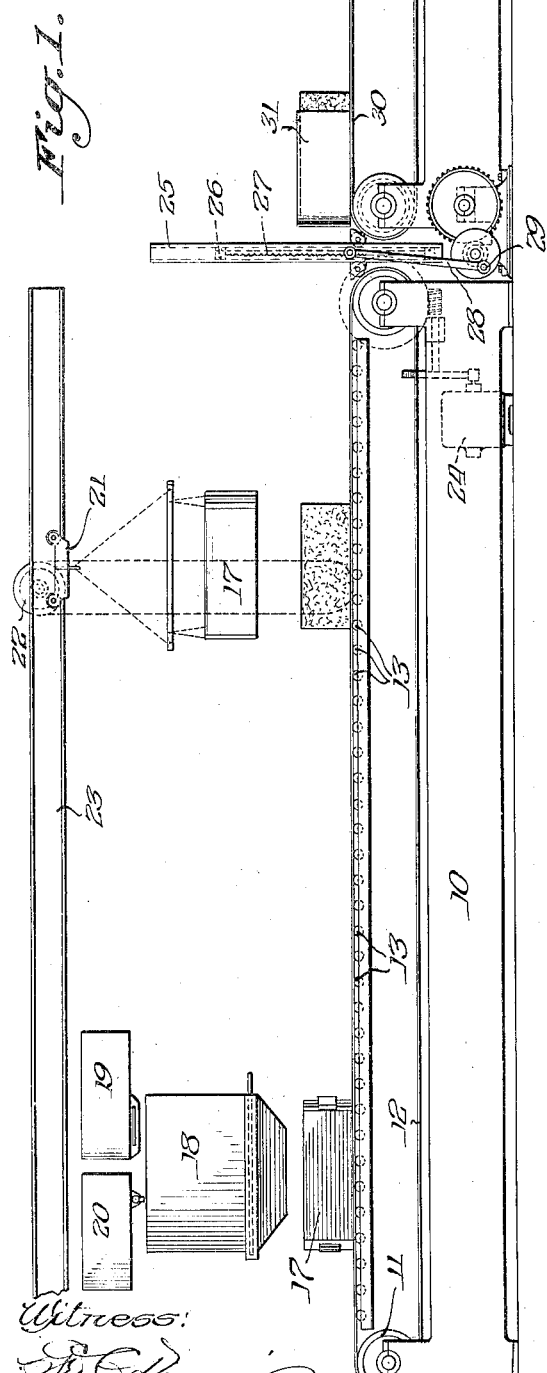
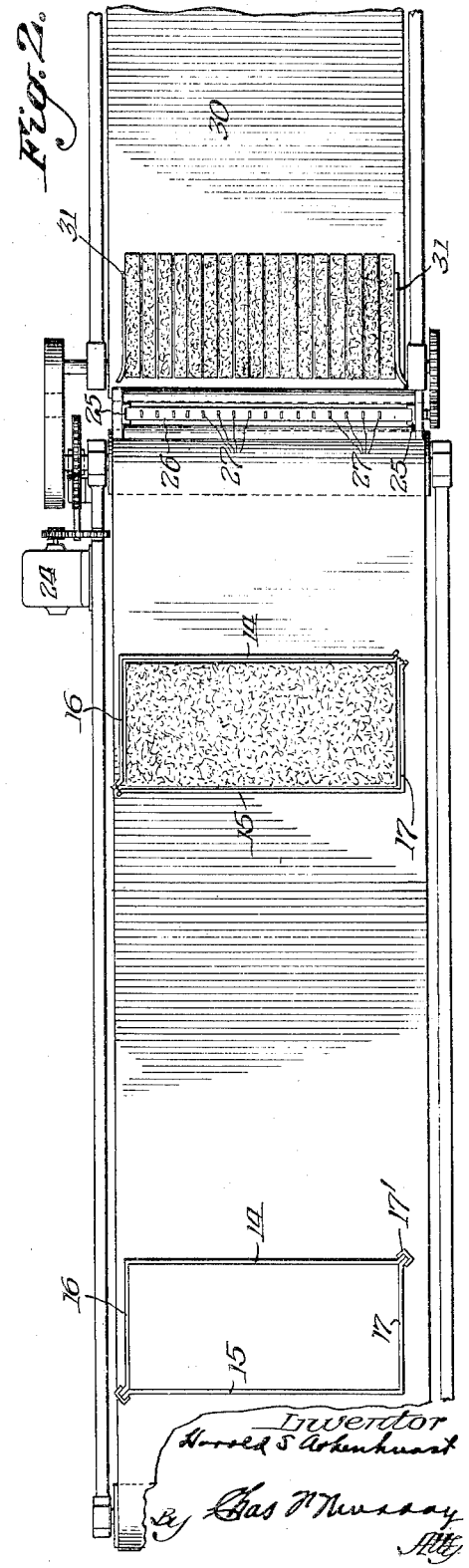

Patented Nov. 30, 1926.

1,608,690

UNITED STATES PATENT OFFICE.

HAROLD S. ASHENHURST, OF CHICAGO, ILLINOIS, ASSIGNOR, BY MESNE ASSIGNMENTS, TO INSULEX CORPORATION, OF CHICAGO, ILLINOIS, A CORPORATION OF DELAWARE.

PROCESS OF AND APPARATUS FOR FORMING CELLULAR BUILDING BLOCKS.

Application filed August 7, 1924, Serial No. 730,721. Renewed May 3, 1926.

My invention relates to the construction of building blocks composed of cellular material.

In the preferred form the invention has to do with the casting of relatively large blocks of cementitious material, then dividing the blocks into smaller units for use in building operations.

One of the particular objects of the invention is the utilization of the substance disclosed in my previous Patent, Reissue No. 15,952, which consists of calcined calcium sulphate as the major ingredient, and a plurality of substances which, in the presence of water, will react and evolve a gas which is trapped within the mass in the form of a multitude of small bubbles. The material in its final form is extremely light and porous and very rigid, considering its porous character. For a more particular description of the substance reference may be had to the aforesaid patent.

In practice I provide a long conveyor and on this conveyor is arranged an open top mold having separable or collapsible side walls. In its initial position the mold is placed beneath a hopper or other means for supplying the materials, and, when suitably mixed, the materials are deposited in the mold. During the travel of the conveyor, the component substances react causing the mass to expand due to the retention of the evolved gas therein, and ultimately the mass sets. This requires about thirty minutes. At that point the mold sides are separated and elevated, leaving the cast block on the conveyor. The continued travel of the block on the conveyor brings the block into contact with a plurality of saws whereby it is divided as desired. As a result of the continuous progressive operation, the blocks are formed ready for immediate use.

Numerous details of more or less importance which have been omitted in the preceding general description may be referred to in the subsequent specific description.

The method and apparatus will be more readily understood by reference to the accompanying drawing, in which, Fig. 1 is a longitudinal view of apparatus designed to carry out the process of my invention, and, Fig. 2 is a plan view thereof with the hopper and crane removed.

The device includes a frame 10 on which are mounted in suitable bearings, the conveyor rolls 11. A conveyor belt 12 passes over the rollers, and at the bottom face of the upper ply it is in contact with a plurality of closely spaced supporting rollers 13.

The expansible mold, which may be of any suitable design, comprises in the construction shown side walls 14 and 15, each side wall having an end wall 16 or 17 formed integrally therewith. At diagonally opposite corners of the mold, the walls are flanged, the two mold parts being releasably secured together by means of U-clips 17.

Above the conveyor 12 near one end, I have provided a hopper 18, which may contain a mixing device if desired, and above the hopper are provided containers 19, 20, for the materials which are to be combined in the mixer.

A suitable crane, including a trolley 21, and a hoist 22, is mounted for longitudinal travel on an I-beam 23, above the conveyor. The conveyor may be operated by means of a motor 24, and suitable slow-down gearing, whereby the conveyor is caused to travel very slowly.

At the discharge end of the conveyor I provide vertical guideways 25, within which is mounted a frame 26, carrying a plurality of saws 27. The frame is rapidly reciprocated by means of a pitman 28 and crank 29, operated by a suitable motor, as shown. Mounted adjacent to the end of the first described conveyor is a second conveyor belt 30, and above the belt at a point adjacent to the saws are guides 31, for controlling the travel of the block as it passes past the saws.

The operation is as follows: A mold being in position on the conveyor 12 beneath the hopper 18, and the necessary materials having been discharged into the hopper and suitably mixed, the materials are discharged from the hopper into the mold in the form of a plastic mass. As the conveyor travels slowly, the material expands due to the evolution of gas in the mass and finally sets. This occurs very shortly after the expansion is complete. Prior to the completion of the setting of the mass, the top is leveled by trowelling or in some other suitable manner, for providing a smooth dense non-cellular top face.

When the mold with the contained block reaches a point near the end of travel of the conveyor, the crane is connected to the mold walls which are elevated by means of the hoist, allowing the block to remain on the conveyor. The mold is then transferred to its initial position beneath the hopper while the block continues its travel, until it contacts with the saws where it is divided into smaller sized blocks ready for building operations, or for other purposes as desired. It will be understood that in the use of my machine and process a considerable number of molds may be used so that a number of blocks are in process of formation at the same time.

While I have illustrated no means for leveling the top of the casting prior to setting, it will be understood that I contemplate the use of some suitable apparatus for that purpose.

The cellular character of the material in its final form renders the block relatively light, and as the cells are divided by the sawing action the surface consists of a multitude of divided cells with which plaster, which may be laid thereon, engages and is firmly keyed.

The particular object is to provide a continuous process of producing blocks of the desired form by means of simple and economically-operating machinery. The design is capable of considerable modification. The form of the conveyor may be changed to include a construction in which the flights are of metal and interlocked so as to present a continuous flat surface when the conveyor is traveling in a straight line. The form of the mold and of the hopper may also be changed, as well as the form and arrangement of the saws by means of which the large block is subdivided as desired.

While I have illustrated a plurality of saws as the means for subdividing the block, I may find it desirable to utilize other means for that purpose.

It will, of course, be understood that while I have considered the finished block as of rectangular form and having its flat faces arranged with the cells exposed, other forms and shapes may be produced as desired and other faces may be presented for the reception of plaster.

The scope of my invention is indicated in the appended claims.

I claim:

1. The process of making blocks, which comprises placing in a mold a mass of materials which will expand and set in expanded condition, then removing the mold when the mass has set, and then moving the expanded and set cellular body of material into contact with dividing means for cutting the body into a plurality of smaller blocks.

2. The process of making blocks, which comprises placing in a mold on a moving conveyor a mass of materials which will expand and set in expanded condition, then removing the mold when the mass has set and before hardening is complete, and then moving the expanded and set cellular mass into contact with dividing means for cutting the mass into a plurality of smaller blocks.

3. The process of making blocks, which comprises providing a mold by placing a side wall structure upon a smooth base, placing in the mold a mass of materials which will expand and set in expanded condition, then lifting the side wall structure from the mass after it has set, and then moving the expanded and set cellular body of material into contact with dividing means for cutting the body into a plurality of smaller blocks.

4. The process of making blocks, which comprises providing a mold by placing a side wall structure upon a smooth conveyor belt which serves as the bottom for the mold, placing in the mold a mass of materials which will expand and set in expanded condition in the mold while it moves forward, then lifting the side wall structure from the mass after it has set and before hardening is complete, and then by its movement on the conveyor carrying the expanded and set cellular body of material into contact with dividing means for cutting the mass into a plurality of smaller blocks.

5. The process of making blocks, which comprises placing in a mold a mass of materials which will expand and set in expanded condition, then dressing down the top face of the block of materials in the mold serving to provide a non-cellular top face, then removing the mold from the block when the mass has set sufficiently to hold its form, and then moving the expanded and set cellular body of material into contact with dividing means for cutting the body into a plurality of smaller blocks.

6. The process of making blocks, which comprises placing in an expansible mold on a moving conveyor a mass of materials which will expand and set in expanded condition, then removing the mold when the mass has set, and then carrying the expanded and set cellular body of materials in the position in which it was formed on the conveyor into contact with saws for cutting the block into a plurality of smaller blocks.

7. The process of making blocks, which comprises providing a mold by placing a side wall structure upon a smooth conveyor belt which serves as the bottom for the mold, placing in the mold a mass of materials which will expand and set in expanded condition in the mold while it moves forward, then lifting the side wall structure from the mass after it has set and before hardening is complete, and then carrying the said body of materials forward in the position in which it was formed on the conveyor and bringing it into contact with cutting devices beyond the end of the conveyor for severing the block into a plurality of smaller blocks.

8. An apparatus for forming blocks, comprising in combination a mold, hopper means for delivering to the mold a mass of quick-setting plastic materials adapted to expand and set in cellular form, means for carrying the mold forward underneath the hopper for receiving the plastic materials therefrom and then for carrying the block forward after the mold has been removed, and means located in operative position with respect to said carrying means for cutting the block into a plurality of smaller blocks.

9. An apparatus for forming blocks, comprising in combination a side wall mold structure, a conveyor in the form of an endless belt adapted to carry the mold structure forward and at the same time to serve as the bottom face of the mold, means for delivering to said mold as it moves forward a mass of quick-setting plastic materials adapted to expand and set in cellular form, and means located at the end of the conveyor adapted to operate on the block after it has set and after the mold structure has been removed for cutting the block into a plurality of smaller blocks.

10. An apparatus for forming blocks, comprising in combination a conveyor; a mold thereon; a hopper located at a point near the beginning of horizontal travel of said conveyor adapted to receive, mix, and discharge block-forming materials into said mold; means located near the end of the horizontal travel of said conveyor for engaging said mold, separating the same from the cast block, and transferring the mold to its initial position; and means located at the end of horizontal travel of said conveyor for subdividing said block.

11. An apparatus of the character described, comprising in combination a conveyor, means for driving said conveyor continuously, a mold having separable sides and adapted to be carried forward in receiving position on said conveyor, hopper means for discharging into the mold a mass of quick-setting materials adapted to expand and set in the form of a block of cellular formation, a travelling crane adapted to engage the separable sides of said mold after the block has set and to restore said mold to the conveyor in position to be carried again under said hopper means, and subdividing means for dividing the cast block into a plurality of smaller sections as the block is carried forward by the conveyor after the removal of the mold.

12. An apparatus of the character described, comprising in combination an endless belt conveyor, means for driving said conveyor continuously, a mold adapted to be carried forward in operative receiving position on said conveyor, a hopper located above the conveyor near one end thereof for discharging into the mold a mass of quick-setting plastic materials adapted to expand and set in cellular formation, a track above the conveyor extending longitudinally thereof, a carriage movable along said track, hoisting means mounted on the carriage for lifting the mold from the conveyor after the plastic materials have set, and saws located a short distance beyond the end of the conveyor for dividing the cast block into a plurality of smaller blocks as the block is carried forward by the conveyor after the removal of the mold.

Signed at Chicago, Ill., this 4th day of August, 1924.

HAROLD S. ASHENHURST.